W. RUFF.
WORK HOLDER FOR MACHINE TOOLS.
APPLICATION FILED APR. 5, 1917.
1,249,207.
Patented Dec. 4, 1917.
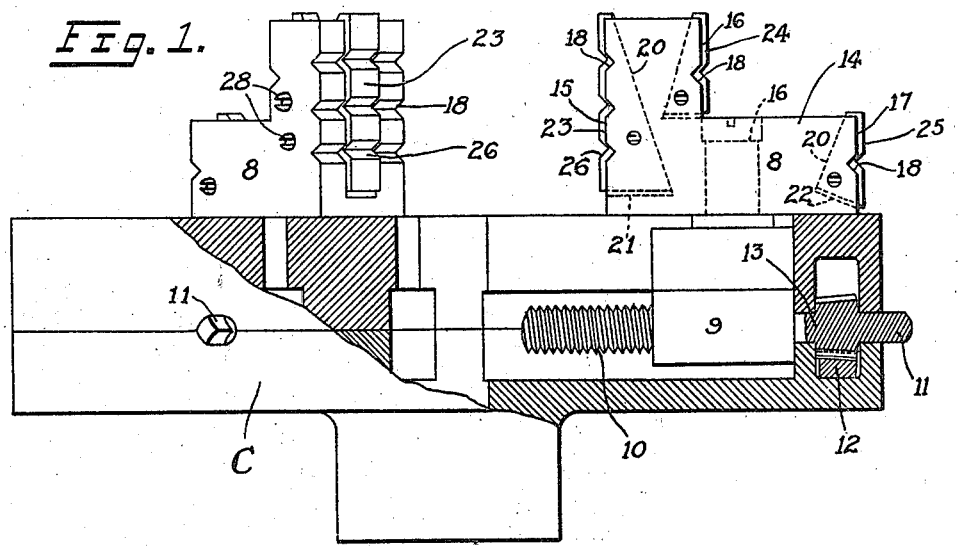
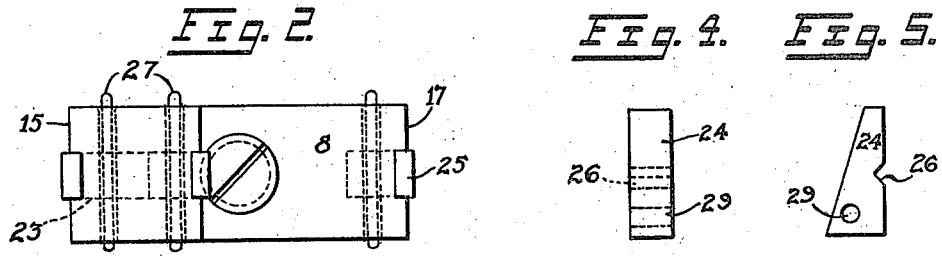
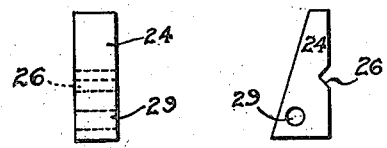
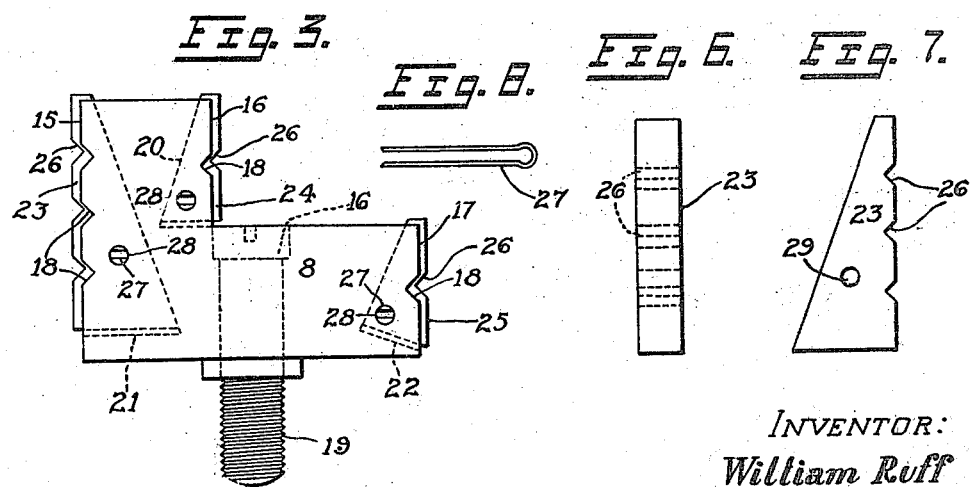
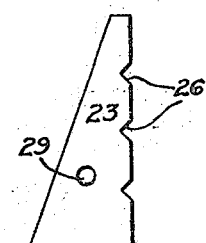
INVENTOR:
William Ruff
By his Attorney, John O. Seifert

UNITED STATES PATENT OFFICE.

WILLIAM RUFF, OF NEW YORK, N. Y.

WORK-HOLDER FOR MACHINE-TOOLS.

1,249,207. Specification of Letters Patent. Patented Dec. 4, 1917.

Application filed April 5, 1917. Serial No. 159,864.

*To all whom it may concern:*

Be it known that I, WILLIAM RUFF, a citizen of the United States, and a resident of the borough of Manhattan, in the city, county, and State of New York, have invented certain new and useful Improvements in Work-Holders for Machine-Tools, of which the following is a specification.

My invention relates to work holders for use in connection with machine tools, and it is the object of the invention to provide a work clamping jaw which is adapted for universal use in chucks or machine tools to draw and firmly secure the work, such as to the table of a planer, shaper and the like, or to the face plate of a lathe, drill press and the like, and to provide a jaw of this character which is simple and cheap in construction and efficient in operation.

In the drawing accompanying and forming a part of this specification, Figure 1 is a side elevation, partly in section, of a chuck or face plate for use in machine tools showing an embodiment of my invention applied thereto.

Fig. 2 is a plan view of the jaw.

Fig. 3 is a side elevation of the jaw.

Figs. 4 and 6 are end elevations, and Figs. 5 and 7 are side elevations, respectively, of dogs used in connection with the jaws; and Fig. 8 is an elevational view of a split pin to support the dogs in the jaws.

Similar characters of reference designate like parts throughout the different views of the drawings.

I have shown an embodiment of my invention in Fig. 1 of the drawing in connection with a chuck or face plate of a lathe, drill press or the like (designated in a general way by C), in which a plurality of work clamping jaws 8 are provided to carry and hold the work at opposite points, the jaws being adjustably carried by the chuck or face plate in a suitable manner, as by carriers in the form of blocks 9 slidably mounted in the plate and having movement imparted thereto by lead screws 10 having means, as at 11, for the application of a wrench or the like to rotate the same.

The jaws comprise an angular shaped block 14 to provide a plurality of faces, shown as three in number 15, 16 and 17, to extend in a vertical plane or direction, which faces may have the usual serrations or corrugations, as at 18, to facilitate the holding of a piece of work. The jaws are releasably connected to the carriers or blocks 9 by threaded studs 19.

In each of the faces 15, 16 and 17 of the jaws is a recess extending through the top and to adjacent the bottom with the rear wall of the recesses inclining to the rear or rearward from the face from the top to the bottom, as shown at 20, with the bottom wall extending at an angle which is preferably at right angles to the face of the jaws, as shown at 21, although this may be at right angles to the rear wall of the recess, as shown at 22. Engaging in the recesses are members or dogs 23, 24 and 25 the rear walls of which are inclined or beveled to correspond with the inclination of the rear walls 20 of the recesses and abutting against the same, said dogs also each having a face extending in a plane parallel with the perpendicular faces of the jaws and having serrations or corrugations 26 to facilitate the gripping action of the dogs.

Means are provided to support the dogs in the jaw recesses to normally maintain the dogs in position with a portion of the faces thereof extending beyond the vertical faces of the jaws and have movement into the recesses and in a vertical direction. For this purpose I provide split pins 27 (Fig. 8) to engage in openings 28 in the jaw and in openings 29 in the respective dogs.

In the operation of clamping a piece of work between the jaws, the jaws are drawn up against the work, for instance by the rotation of the lead screws 10. The dogs are forced against the inclined rear walls 20 of the jaw walls, and should the work not seat squarely against the face plate or the table of a machine tool as the jaws are drawn together the dogs will slide down the inclined rear wall of the jaw recess and thereby forcibly and firmly hold the work against such face plate or table, this movement being permissible as the split portions of the pin are normally spaced from each other by the inherent tension of the pin, as shown in Fig. 8, and as the dogs move into the jaw recesses due to the pressure thereof on the work, and also move in a vertical direction the one portion of the pin will move toward the other, and the dogs will be returned to initial position to extend beyond the face of the jaws, as shown in Fig. 1, as soon as the pressure of the dogs on the work is released. It will be obvious that the jaws may be utilized to hold a piece of work with or without the dogs, and by the provision of the serrations 18 and 26 in the jaws and dogs, respectively, the same may be utilized in connection with an intermediate piece or wedge to hold the work in position, said serrations preventing displacement of such intermediate piece or pieces as the jaws are drawn up to work clamping or holding position.

Having thus described my invention I claim:

1. In a work holder for machine tools, a jaw having a face extending in a vertical plane; a recess in the face of the jaw extending from the top to adjacent the bottom with the rear wall of the recess inclining rearward from the top to the bottom, and the bottom wall of the recess being parallel with the base of the jaw; a dog to engage in said recess having an inclined rear wall to correspond with the inclination of the rear wall of the recess; and a resilient split pin to support said dog in the recess to normally extend beyond the face of the jaw and permit the dog to have movement into the recess and in a vertical direction, substantially as and for the purpose specified.

2. In a work holder for machine tools, a jaw having a face extending in a vertical plane; a recess in the face of the jaw extending from the top to adjacent the bottom with the rear wall of the recess inclining to the rear from the top to the bottom, and the bottom wall rectangular to the rear wall; a dog to engage in and conform to said recess, said dog having a face extending parallel with the face of the jaw; serrations extending transversely of the faces of the jaw and dog; and a split resilient pin engaging in openings in the jaw and dog to support the latter in the jaw recess to have movement into the recess and in a vertical direction, substantially as and for the purpose specified.

3. In a work holder for machine tools, a jaw having a face extending in a vertical plane, serrations extending transversely of the face of the jaw, and a recess in the face of the jaw, the rear wall of which recess inclines rearwardly from the top toward the bottom and having a bottom wall angularly arranged to the rear wall, a member to engage in said recess having an inclined rear wall to correspond with the inclination of the rear wall of the recess, and means to support the member in the recess, substantially as and for the purpose specified.

4. In a work holder for machine tools, a jaw having a series of faces extending in a vertical plane; a recess in each of said faces, said recesses extending through the top but not the bottom of the jaw and the rear walls inclining rearward from the top to the bottom; dogs to engage in said recesses, the rear walls of which jaws are inclined to correspond with the inclination of the rear walls of the recesses; serrations extending transversely of the faces of the dogs and jaws; and split pins to engage in openings in the jaws and dogs to yieldingly support the dogs to extend slightly beyond the faces of the jaws and permit said dogs to have movement into the recesses and in a vertical direction, substantially as and for the purpose specified.

Signed at New York city, in the county of New York, and State of New York this 2nd day of April, 1917.

WILLIAM RUFF.

Copies of this patent may be obtained for five cents each, by addressing the "Commissioner of Patents, Washington, D. C."